UNITED STATES PATENT OFFICE.

OLAF JENSEN, OF RJUKAN, NORWAY, ASSIGNOR TO NORSK HYDRO-ELEKTRISK KVAELSTOFAKTIESELSKAB, OF CHRISTIANIA, NORWAY.

PROCESS OF CONVERTING NITROUS GASES INTO CONCENTRATED NITRIC ACID.

1,197,295.  Specification of Letters Patent.  Patented Sept. 5, 1916.

No Drawing.  Application filed May 27, 1916. Serial No. 100,310.

*To all whom it may concern:*

Be it known that I, OLAF JENSEN, a subject of the King of Norway, residing at Rjukan, in the Kingdom of Norway, have invented certain new and useful Improvements in Processes of Converting Nitrous Gases Into Concentrated Nitric Acid; and I do hereby declare the following to be a full, clear, and exact description of the invention, such as will enable others skilled in the art to which it appertains to make and use the same.

This invention has for its object a process of converting nitrous gases into concentrated nitric acid.

It is a well-known fact, that nitrous gases are readily and almost completely absorbed in concentrated sulfuric acid, whereby nitrosulfonic acid is formed. Hitherto it was not possible to transform the nitrosulfonic acid so obtained directly and in one single operation into concentrated nitric acid. Suggestions of treating the nitrosulfonic acid with oxidizing substances and the like in order to produce concentrated nitric acid have not led to practically useful results. The method most generally in use at present consists in treating the solution of nitrosulfonic acid in sulfuric acid with water or steam, thus effecting the decomposition of the nitrosulfonic acid in sulfuric acid and nitrous gases, and absorbing the latter in water in absorption towers. In this manner a nitric acid is obtained, which at best has a strength of about 67% if very concentrated nitrous gases are used. This acid must be treated with drying agents, when further concentration is to be effected.

The applicant has now invented a method according to which concentrated nitric acid may be obtained directly from the solution of nitrosulfonic acid in sulfuric acid. To this purpose the denitration is carried out in a tower of acid-resisting material, at the top of which the nitrosulfonic acid solution is supplied, while simultaneously vapors of watery nitric acid are introduced at the bottom of the tower. Under these circumstances a mixture of nitrous gases and vapors of concentrated nitric acid issues from the top of the tower. Besides the vapors of nitric acid and water introduced in the lower portion of the apparatus it is most convenient to provide at this point also a supply of gas, preferably containing oxygen, for instance air, in order to expel the nitric acid retained by the sulfuric acid.

In condensing the gases and vapors leaving the tower, red fuming nitric acid is obtained which may easily be freed from nitrogen oxids by blowing air through the acid in a tower, the resulting product being highly concentrated pure colorless nitric acid. The nitrous gases from the denitration as well as from the blowing apparatus are taken to an absorption system, where they are absorbed in water. The dilute nitric acid so obtained serves for denitration of further quantities of nitrosulfonic acid in the manner described.

The sulfuric acid, that leaves the denitrating apparatus has in this process a relatively high concentration, about 80%, much higher than in the denitrating process, as it is usually worked, when the concentration must be lowered to about 65% in order to have the nitrogen oxids completely expelled. This effect is due to the use of nitric acid for denitration. The nitric acid oxidizes the nitrosulfonic acid, thereby decomposing it and liberating nitrous gases according to the equation:

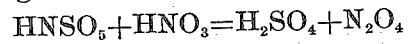

$$HNSO_5 + HNO_3 = H_2SO_4 + N_2O_4$$

Under the conditions prevailing in the denitrating tower this reaction is quantitatively performed when the concentration of the sulfuric acid is lowered to 80%. Thus it is possible to effect the denitration of the sulfuric acid with a far less quantity of water than is otherwise necessary. A nitric acid of about 60% has proved very fit for the purpose.

The most important advantages offered by the present invention are, that concentrated nitric acid is obtained directly from the mixture of nitrosulfonic acid and sulfuric acid, and that the denitrated sulfuric acid has a rather high concentration so that the cost required to bring it up to the concentration suitable for absorbing fresh quantities of nitrous gases are considerably diminished.

Claims:

1. The process of converting nitrous gases into concentrated nitric acid comprising the steps of absorbing nitrous gases in concentrated sulfuric acid and treating the solution of nitrosulfonic acid so obtained with vapors of nitric acid, thereby producing concentrated nitric acid and strong nitrous gases, which latter are absorbed in water for producing dilute nitric acid.

2. The process of converting nitrous gases into concentrated nitric acid comprising the steps of absorbing nitrous gases in concentrated sulfuric acid, treating the solution of nitrosulfonic acid so obtained with vapors of nitric acid, thereby producing concentrated nitric acid and strong nitrous gases, absorbing the said nitrous gases in water and using the dilute nitric acid so obtained for treating the nitrosulfonic acid produced by absorbing nitrous gases in concentrated sulfuric acid.

In testimony that I claim the foregoing as my invention, I have signed my name in presence of two subscribing witnesses.

OLAF JENSEN.

Witnesses:
A. Foss,
C. Vorma